United States Patent
Spitzig et al.

(10) Patent No.: US 8,374,398 B2
(45) Date of Patent: Feb. 12, 2013

(54) LINEAR IMAGE LIFT ARRAY FOR TRANSPORTED MATERIAL

(75) Inventors: Roger Spitzig, Ontario (CA); Mark Woolston, Copper Canyon, TX (US)

(73) Assignee: Bell and Howell, LLC., Wheeling, IL (US)

( * ) Notice: Subject to any disclaimer, the term of this patent is extended or adjusted under 35 U.S.C. 154(b) by 703 days.

(21) Appl. No.: 12/579,039

(22) Filed: Oct. 14, 2009

(65) Prior Publication Data

US 2010/0092029 A1   Apr. 15, 2010

Related U.S. Application Data

(60) Provisional application No. 61/105,107, filed on Oct. 14, 2008.

(51) Int. Cl.
*G06K 9/00* (2006.01)
(52) U.S. Cl. .................................................. 382/112
(58) Field of Classification Search .................. 382/101, 382/112, 312, 323; 250/556; 356/71, 237.1, 356/239.7; 209/576; 348/92, 145, 166
See application file for complete search history.

(56) References Cited

U.S. PATENT DOCUMENTS

| | | | |
|---|---|---|---|
| 4,050,816 A * | 9/1977 | Stemmle | 355/75 |
| 4,760,606 A * | 7/1988 | Lesnick et al. | 382/306 |
| 4,817,184 A * | 3/1989 | Thomason et al. | 382/141 |
| 5,495,535 A * | 2/1996 | Smilansky et al. | 382/145 |
| 5,862,243 A * | 1/1999 | Baker et al. | 382/101 |
| 6,311,892 B1 | 11/2001 | O'Callaghan et al. | |
| 6,346,713 B1 * | 2/2002 | Van Valkenburg | 250/559.45 |
| 6,510,992 B2 | 1/2003 | Wells et al. | |
| 6,674,523 B2 * | 1/2004 | Kawamorita et al. | 356/237.2 |
| 7,800,779 B2 * | 9/2010 | Fan et al. | 358/1.9 |
| 2002/0030711 A1 * | 3/2002 | Minckler | 347/19 |
| 2003/0137101 A1 * | 7/2003 | Hendzel | 271/272 |
| 2005/0149225 A1 | 7/2005 | Spitzig et al. | |
| 2006/0157912 A1 * | 7/2006 | Nagao | 271/121 |
| 2008/0011654 A1 * | 1/2008 | Hale et al. | 209/584 |

* cited by examiner

*Primary Examiner* — Claire X Wang
*Assistant Examiner* — Shervin Nakhjavan
(74) *Attorney, Agent, or Firm* — McDermott Will & Emery LLP

(57) ABSTRACT

The subject matter presented herein relates to a method, system and program product for performing image capture of items. In particular the image capture occurs during transport of the items by a high-speed transport device. The image is captured by a linear array imaging sensor as a face of the item is transported at a continuous production speed in near proximity to the linear array imaging sensor.

21 Claims, 6 Drawing Sheets

LINEAR IMAGE LIFT ARRAY FOR TRANSPORTED MATERIAL

RELATED APPLICATIONS

This application claims the benefit of U.S. Provisional Application No. 61/105,107, filed Oct. 14, 2008, the disclosure of which is entirely incorporated herein by reference.

TECHNICAL FIELD

The subject matter presented herein relates to a method, apparatus and program product for performing image capture of items during transport of said item by a high-speed transport device.

BACKGROUND

Document processing devices are effective tools for processing documents of various types. For example, mail processing facilities often employ a multitude of document processing devices to process letters, packages, envelopes, coupon booklets, brochures, post cards and other mail items intended for distribution via a mail distribution network (e.g., the United States Postal Service (USPS)). The types of devices employed may include high-speed sorters for sorting mail items according to a sort scheme, high-speed inserters for inserting documents that comprise a mail item, cutters, printers, accumulators and folders for generating, assembling, arranging and organizing mail items in connection with a sorter or inserter, mail bins for accumulating the multitude of mail items processed in preparation for distribution, etc. Whether used independently or in combination, the aforementioned document processing devices must be able process documents at very high speeds with sufficient accuracy along a transport path. Consequently, it is not uncommon for such devices to stage one or more imaging devices along the transport path to capture images of a mail item as it is processed.

Commonly, imaging devices integrated within a document processing device are used in connection with an object character recognition or barcode reader utility to perform address verification or validation, wherein the address components and/or delivery point identifiers printed upon a mail item are checked for accuracy and compliance with postal authority regulations or sort processing, wherein again the address components and/or delivery point identifiers printed upon a mail item act as input to a sort scheme that informs a sorter's processing decisions. In other instances, images of a mail item may be maintained for qualitative analysis, error checking, sequence verification, barcode integrity, address cleansing, data mining, machine control, item tracking and other forms of examination useful for ensuring a mail item is generated or sorted to garner the maximum postal authority discounts. The frequency of image capture occurring during mail item transport through a high-speed document processing device will depend greatly on the types of and extent of analysis required to be performed to render a high quality mail item. For the most part, greater frequency of imaging of a mail item through a document processing device results in enhanced mail quality given that the mail item is progressively viewed throughout processing.

Of course to achieve such capability, typical document processing devices employ high speed imaging devices (cameras). While effective for imaging transported documents as they traverse through the document processing device at high speeds, the frequency, or rather, potential points of image capture is limited. This is due in large part to the physical and functional requirements of such cameras, which tend to be of a form factor not befitting often condensed areas where imaging may be desired. For instance, a desired point of image capture within the document processing device may be the point of contact of the document with the primary transport belt in a sorting device, at the output channel of a printer within a printer or high speed print inspection system, or at the point of document collating or assembly within an inserting device. Typical high speed imaging devices are not well suited physically for accommodating image capture in such tight areas of the document processing device.

Also, from a functional standpoint, typical high speed cameras are limited in that they must be positioned at a fixed depth or in accord with a specified imaging range/area in order to enable effective image capture during high speed transport. This is due to the fact that that they rely upon optical imaging techniques, area based scanning requirement, etc. for image capture. This may include a required offset distance from the camera to the target for enabling two-dimensional image capture. Also, this may include usage of varying lenses, mirrors and other devices for transmitting sensed image data to the camera sensors during transport—a requirement that for a typical document processing device limits camera placement and hence image capture frequency and opportunity. Such limitations as described above especially limit effective throughput of the device as well as full scanning of a document without reductions in speed.

SUMMARY

The method and system presented herein enables an effective means of enabling greater frequency and opportunity for image capture within a document processing device.

In one instance, a method of assessing the production quality of an article of a mail item during transport of the article within a document processing system is provided. The method includes capturing, by a linear array imaging sensor, full line scan data for the article as a face of the article is transported at a continuous production speed in near proximity to the linear array imaging sensor. The linear array imaging sensor has a resolution substantially equal to a number of photo sensors of the linear array imaging sensor, lacking an associated optical transmission medium, and having a form factor that facilitates placement along the mechanical transport path substantially perpendicular to the direction of transport. The method includes illuminating the article during the capturing of the full line scan data. An image of at least a portion of the face of the article is constructed from the full line scan data captured by the linear array imaging sensor. The image of the article is evaluated during the transport of the document at continuous production speed according assess production quality of the article.

In some instances, a document processing system is provided. The system includes a mechanical transport path for transporting an article of a mail item in a direction of transport at a continuous production speed. The system includes a linear array imaging sensor lacking an associated optical transmission medium and having a form factor that facilitates placement along the mechanical transport path substantially perpendicular to the direction of transport and such that a face of the article travels in near proximity to the linear array imagining sensor. The linear array imaging sensor has a resolution substantially equal to a number of photo sensors of the linear array imaging sensor and captures full line scan data for the article as the article travels at a continuous production speed. An illumination source is proximate to the linear array imaging sensor to direct light at the article as the article is transported at the continuous production speed and scanned by the linear array imaging sensor. An image processor is in communication with the linear imaging sensor that processes the line scan data to construct an image of at least a portion of the face of the article. A control processor is in communication with the image processor that evaluates the image of the article during the transport of the article at continuous production speed to assess production quality of the article.

In yet other instances, an article of manufacture is provided. The article includes a machine readable storage medium and executable program instructions embodied in the machine readable storage medium that when executed by a programmable system in communication with a document processing system, causes the system to perform functions that evaluate a portion of an article of a mail item during transport of the article within a document processing system. The functions include capturing, by a linear array imaging sensor, full line scan data for the article as a face of the article is transported at a continuous production speed in near proximity to the linear array imaging sensor. The linear array imaging sensor has a resolution substantially equal to a number of photo sensors of the linear array imaging sensor, lacking an associated optical transmission medium, and has a form factor that facilitates placement along the mechanical transport path substantially perpendicular to the direction of transport. The article is illuminated during the capturing of the full line scan data. An image of at least a portion of the face of the article is constructed from the full line scan data captured by the linear array imaging sensor. The image of the article is evaluated during the transport of the document at continuous production speed according assess production quality of the article.

Those skilled in the art will recognize that the techniques outlined above will often be implemented using programmed computers and/or network communications. Hence, the methodology may be embodied in appropriate programmed computer systems or in software products for programming one or more such systems. Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
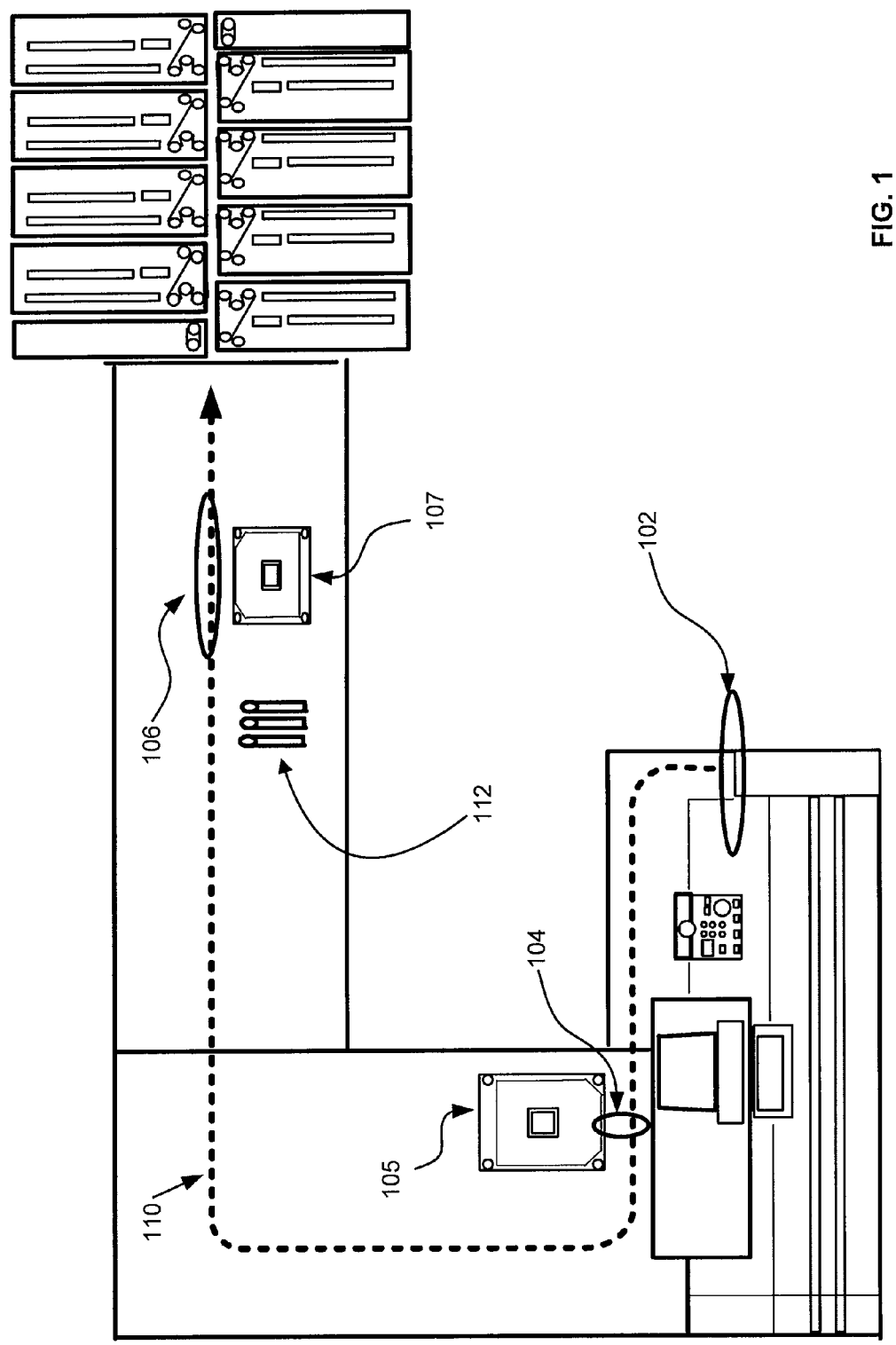
FIG. 1 depicts an exemplary high-level block diagram of a sort processing system featuring potential points of placement or proximity of one or more linear array imaging sensors.

FIG. 1 depicts an exemplary high-level block diagram of a sort processing system 100 featuring points of placement or proximity of one or more linear array imaging sensors. In the exemplary figure, the points of placement are illustrated by circles 102-106; all of which represent points of interest or proximity along the sorter processing system's transport path 110 wherein it is desired to capture an image of a document. Today's sort processing systems employ one or more traditional camera device systems 105 and 107, positioned at or directed towards a respective point of placement, for performing image capture. However, in accord with the teachings herein, one or more linear array imaging sensors may be mounted proximate to the transport path 110 accordingly for enabling image capture. Of particular importance is that said linear array imaging sensors, which are depicted in greater detail in FIG. 3, may be mounted in-line vertically or horizontally relevant to the face of the document for enabling image capture.

For example, point 104 along the sort processing system's transport path 110 may include or be proximate to a linear array imaging sensor positioned inline respective to the transport path as opposed to a traditional high-speed camera device 105 for performing initial imaging of a document for address recognition or quality verification purposes. As another example, point 106 along the transport path 110 may include or be proximate to a linear array imaging sensor as opposed to a camera device 107 for performing barcode verification following application of a barcode by one or more print heads 112. Still yet, linear array imaging sensors may include or be proximate to point 102 for performing imaging at the initial point of contact of a document to the transport path 110. In general, those skilled in the art will recognize that linear array imaging sensors may be effectively employed to capture image data as does a typical high-speed imaging device (e.g., cameras), but with less stringent depth-of-field, lens calibration and other requirements. Furthermore, usage of such devices may enable advanced placement flexibility along a transport path 110 due to their relatively small form factor and reduced cost. Consequently, linear array imaging sensors may be employed at multiple other places throughout the sort processing system—some of which may be very tight due to the array of mechanical components resident along the transport path 110—where in-line image interpretation is desired during processing of a document at high speeds. Consequently, no reconfiguration of the orientation, placement, extent or other of the mechanical transport path need be performed, especially for in-line image capture in areas along the transport that are particularly and traditionally not image capture friendly.

Figure 2:
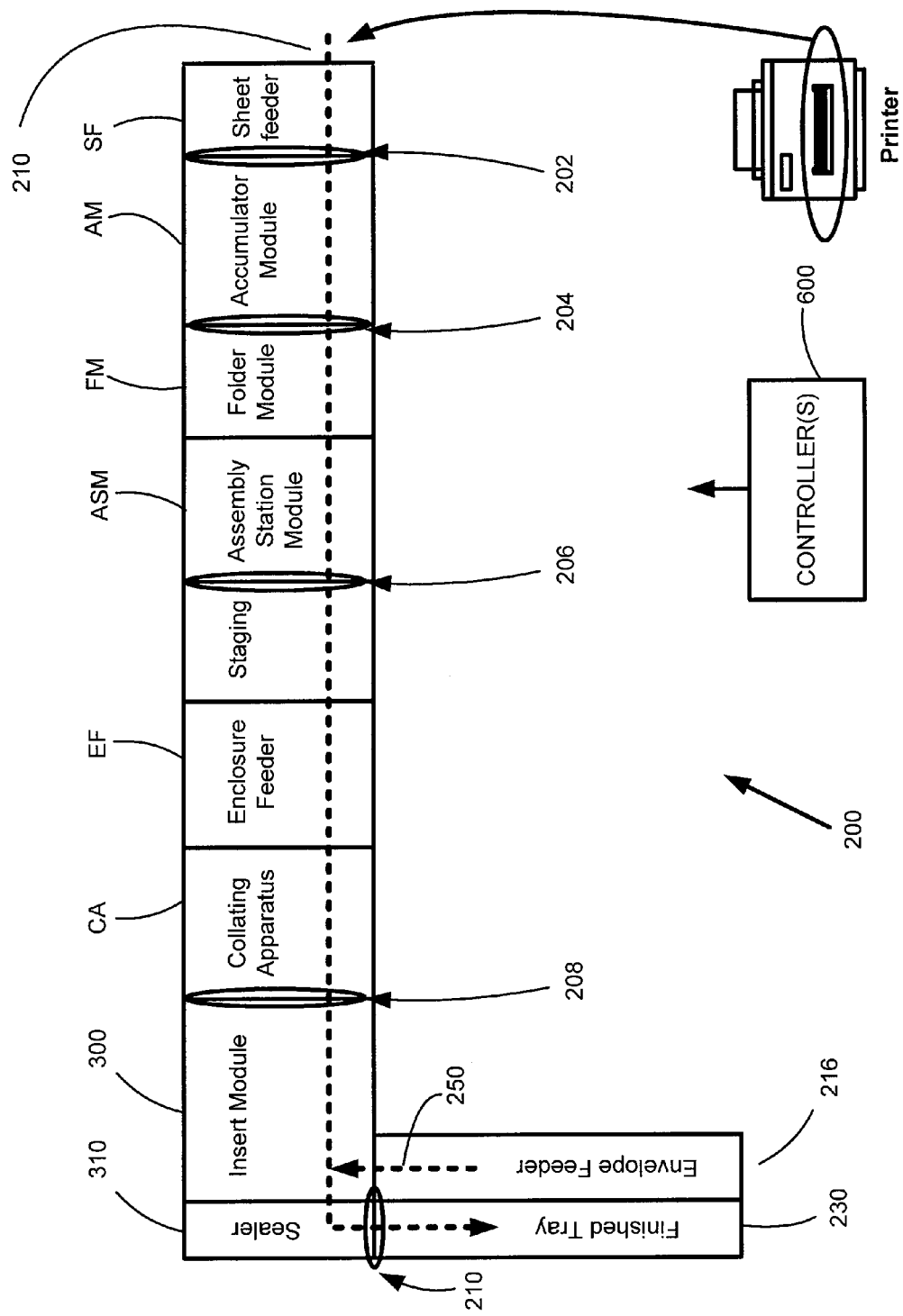
FIG. 2 depicts an exemplary high-level block diagram of an insert processing system featuring potential points of placement or proximity of one or more linear array imaging sensors.

Linear array imaging sensors may also be employed for use at various points of placement 202-208 within a document manufacturing device such as inserter system 200, depicted in FIG. 2. In the exemplary figure the points of placement are illustrated by circles 202-208; all of which represent points of interest or proximity along the inserter system's transport path 210 where it is desired to capture an image of a document as it is processed from one module of the system to the next. For instance, point 202 along the transport path 210 may include or be proximate to a linear array imaging sensor at the point of document entry into an accumulation module AM by a sheet feeder SF. Other points 204-208 of placement may be for capturing an image of the document in its accumulated state, for capturing an image of the document post assembly by an assembly station module ASM or for capturing an image of the document post collation by a collating apparatus CA respectively. Hence, image capture may occur at various moments of processing by the inserter system 200 prior to its actual handling by an inserter module 300 that secures the collated document(s) into an envelope.

Figure 3:
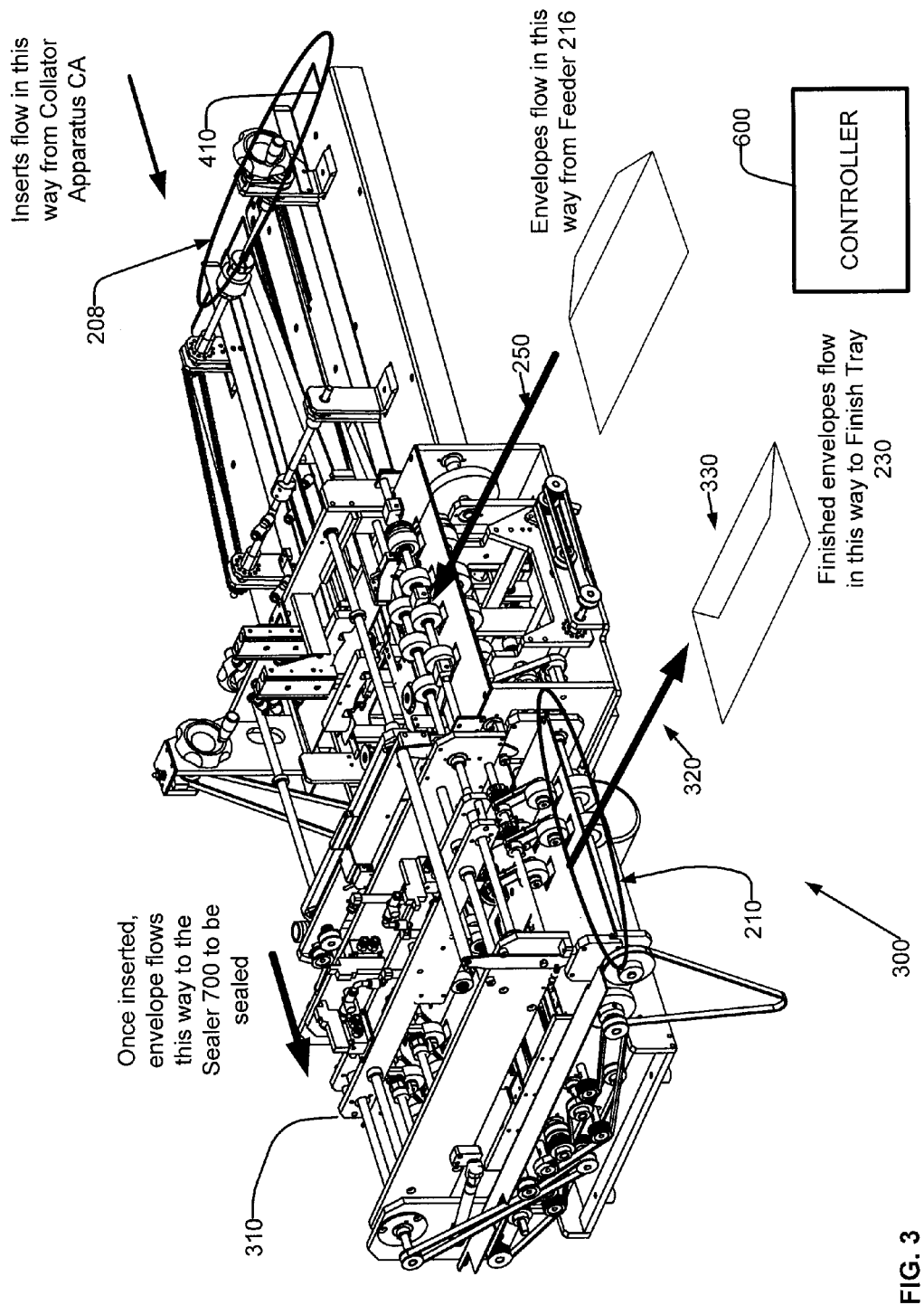
FIG. 3 depicts an exemplary inserter module of the inserter processing system of FIG. 2 featuring potential points of placement or proximity of one or more linear array imaging sensors for enabling downright image capture.

In FIG. 3, an exemplary inserter module 300 is depicted, again showing a point of placement 208 of a linear array imaging sensor for image capture; image capture performed post-collation of one or more documents (a set of documents) intended for insertion into an envelope. Envelopes flow from the envelope feeder in the direction 250 as shown, where they are positioned with enclosure flap open to enable insertion of the document set. Once insertion occurs, the envelope is advanced to a sealer module 310 of the inserter module 200 where the envelope flap is closed and the finished document is advanced to a finish tray 230. An image of the finished document, which in this case is a mail item 330, may then be captured at a point of placement 210 of a linear array imaging sensor. As in all of the above described points of placement, the document would be advanced such that it is adjacent to the linear array imaging sensor, the plane of the sensor being perpendicular to the direction of travel 320 of the document being imaged. Hence, the array of sensing elements comprising the plane of the sensor is positioned complimentary to the face of the document to be imaged, thus making it suitable for placement in various orientations. Those skilled in the art will recognize that the orientation of the document 330 as depicted in FIG. 2—relative to an adjacently placed linear array imaging sensor at or proximate to said document—will render an image of the face of said document 330.

Figure 4A:
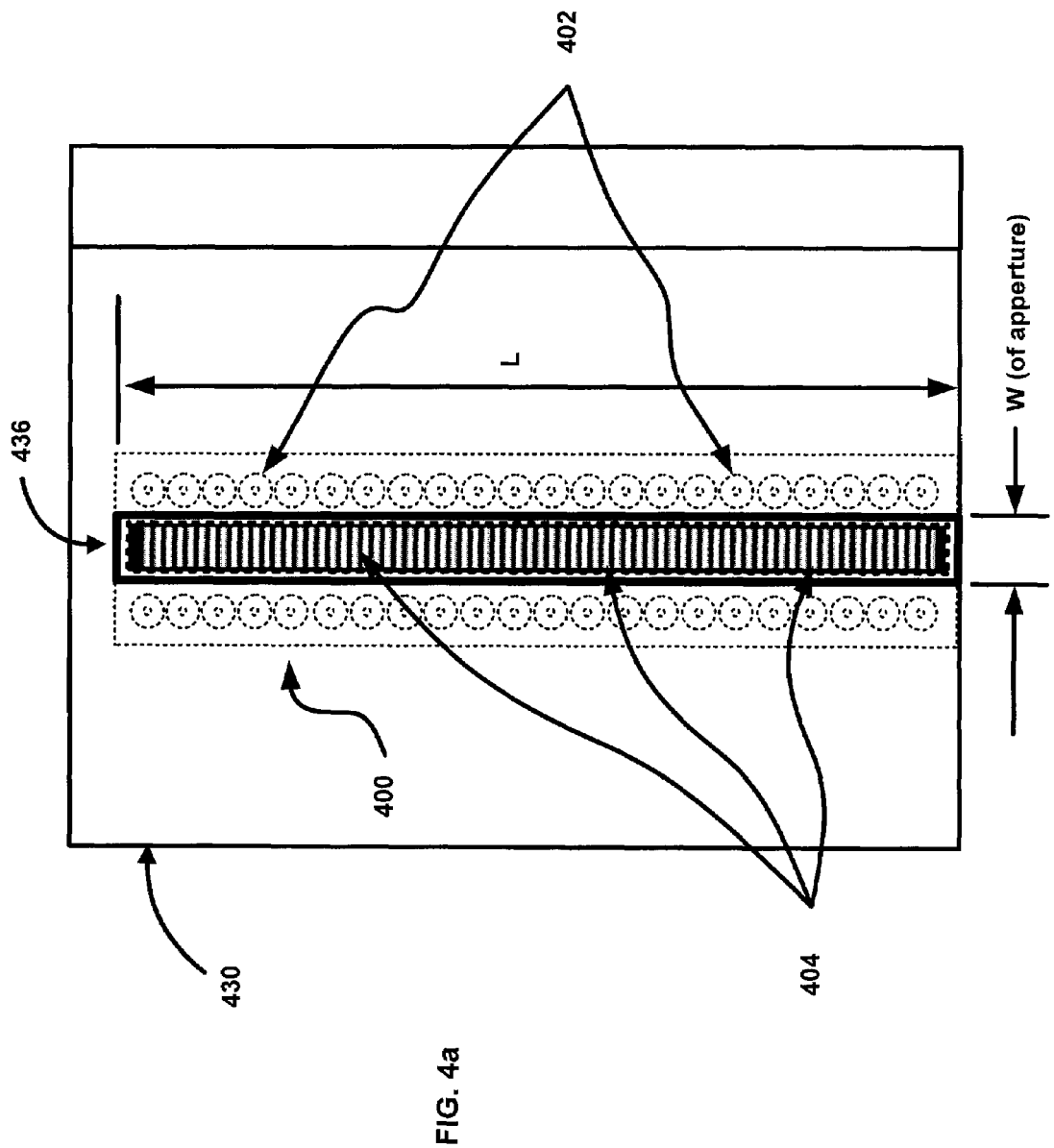
FIGS. 4a-4b depict an exemplary linear array imaging sensor with associated components for stabilizing a document to be imaged as mounted perpendicular to the direction of transport of the document for enabling upright image capture.

FIG. 4a depicts an exemplary linear array imaging sensor as shown as a dashed-line image behind an opaque platen 430 having an aperture 436 provided therein. In this example, the linear array imaging sensor is mounted perpendicular to the direction of transport of a document to be imaged such as to enable upright image capture. Of course, it will be recognized by those skilled in the art that the linear array imaging sensor 400 may be mounted in a downright position to enable image capture as well. Indeed, the linear array imaging sensor 400 may be positioned accordingly relative to the image capture needs required and in accordance with the positioning of a document to be captured along the transport path. Furthermore, the linear array imaging sensor may be more readily integrated into and/or along a document transport system where traditional camera based imaging techniques (i.e., two-dimensional area scanning, oversampling) are not feasible due to depth-of-field or placement limitations.

As presented herein, a linear array imaging sensor 400 is a module comprising one or more linearly oriented photo sensor elements 404 for sensing/detecting objects positioned in near direct contact to said elements. The sensor elements 404 may be positioned adjacent to one another within the module to generate an array that extends a desired length L. Preferably, the length L of the array is suitable for enabling sensing of at least a portion if not the entire extent (length) of a face of a document to be detected as it is within proximity of the array during transport. Width W of the sensing elements are also preferably sufficient to support image capture on at least a line-by-line basis of a passing document. By employing an array of linearly positioned photo sensor elements 404, wherein the effective image resolution is equivalent to the resolution achieved through the spacing of said sensor elements 404, an effective full line scan of a document may be performed as it is transported along a given transport path in a direction X. This effectively eliminates the need for mirrors or other optical transmission mediums to transmit data to the sensor elements 404. Rather, the linear array imaging sensor 400 need only employ a focusing lens of the appropriate curvature for enabling a virtual 1:1 relationship between a given sensor element 404 and a portion of the object to be scanned. Because the document is full line scanned, the scan rate of the linear array imaging sensor may be adapted in accord with the detected production speed of the document during transport—i.e., a rate detected via an encoder module operable in connection with the transport. As such, full scan at a continuous production speed is maintained.

The linear array imaging sensor 400 is flanked by various red, green and blue LEDs 402, which combine to provide white light to be directed to the portion of the document to be sensed/imaged. The light that is reflected from the document as it is in transport is concentrated into the focusing lens of a respective photo sensor element 404. The sensor then records the data as sensed—as it is line scanned—according to the intensity of light that is transmitted back to it. This image data is then processed by a control processor, data acquisition or data interpretation tool (e.g., object character recognition software, barcode reader) operable in connection with the linear array sensor. Resultantly, the data as sensed may be compiled into a composite image and interpreted accordingly to enable further processing or machine control techniques (e.g., document quality verification, device deactivation, sort processing analysis, etc.). In particular, inspection of a document in this manner may be employed to trigger subsequent machine processing events or adapt pre-established workflow processing steps.

Figure 4B:
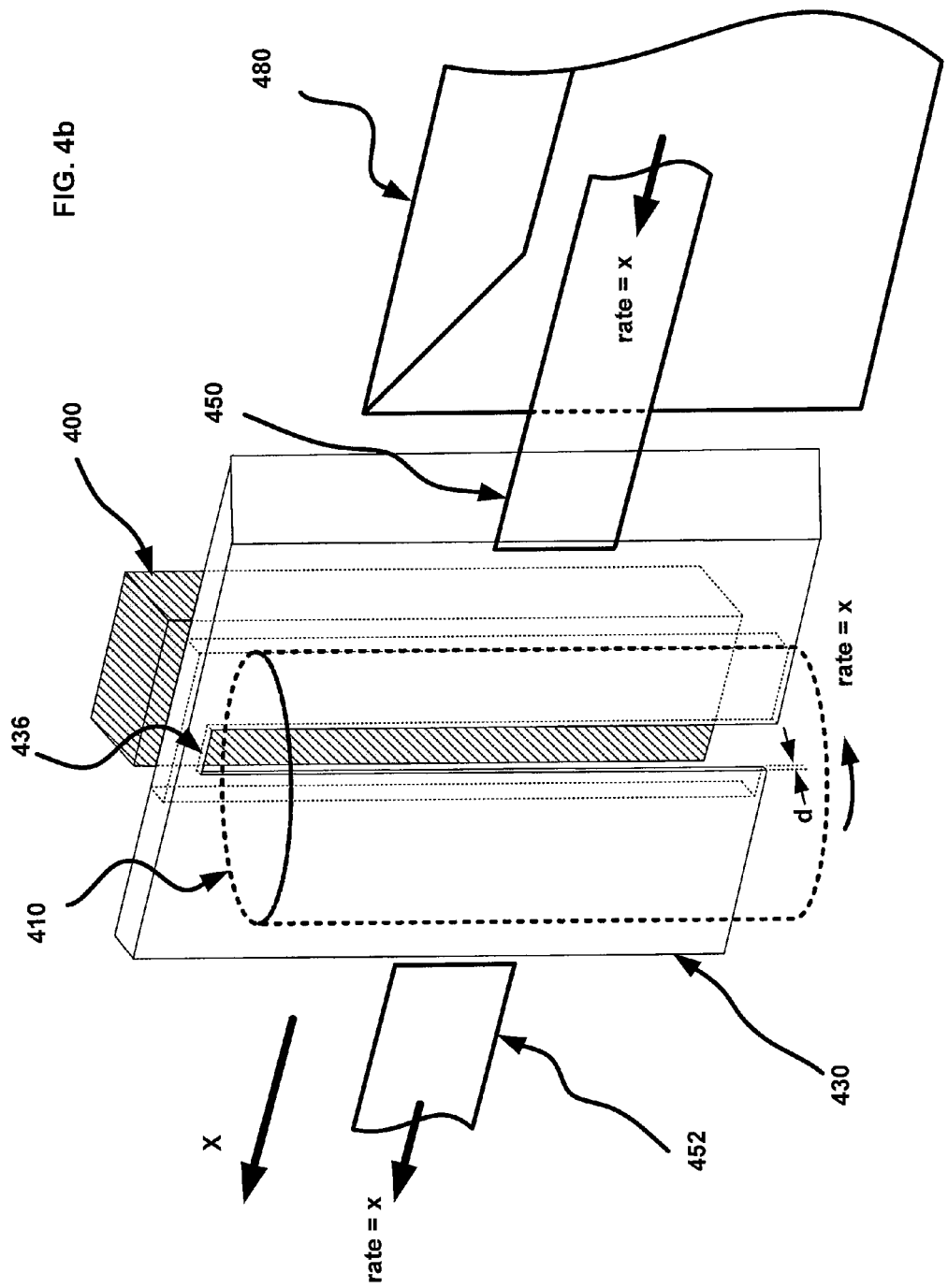

With reference now to FIG. 4b, the document 480 to be inspected or imaged is positioned for near direct contact with the sensing elements 404 comprising the linear array 400 via a stabilization mechanism, comprising at least a roller 410 and a platen 430 featuring an aperture 436. The stabilization mechanism maintains the mail items at a controlled depth of field relative to the one or more photo sensors as document 480 is processed by the document processing system at a continuous production rate. The roller 410, shown as a dotted image for clarity, is comprised of a malleable material (e.g., sponge-like material) that presses the document towards aperture 420 within opaque platen 430 as it is transported in direction X. Generally, the roller 410 will be only slightly offset from the platen 430 such that enough frictional pull may be exerted to further the document along the path as it rotates at a rate x in direction X. An initial transport belt 450 advances the document 480 along at a rate x until it makes contact with the platen, where it is further advanced along its surface and in front of the sensor array 400 by roller 410 at the same rate x. As such, the face of the document 480 is adjacent to the face of the platen 430, while the sensors face in a direction perpendicular to the direction of document transport X. Once the document surpasses the platen 430 it is advanced further along the transport path in direction X by a second belt 452 that also operates at a rate x. Those skilled in the art will appreciate that the document may be imaged via the linear array imaging sensor 400 while maintaining a continuous relative transport speed.

The platen 430 lays atop the linear array imaging sensor 400 such that the aperture is aligned with and exposes the full length L and width W of the sensor elements 404 comprising the array 400. Resultantly, an area of the document 480 corresponding to the length L and width W of the array is sensed (imaged) from moment-to-moment as the document is advanced along at rate x. This corresponds to a line-by-line scanning of the document as it is transported. The platen 430 may be comprised of glass or some other opaque material so that light may be directed at the document accordingly through the material to the document surface. While individual design requirements may vary, the aperture maintains a limited depth d such that pressing of the document by the roller 410 at that point results in even closer (near direct) contact of the document as positioned proximate the linear array imaging sensor. As such, the roller 410 enables the document 480 to break the contact plane of the platen 430, while enabling it to stay in a fixed position suitable for line scanning/image capture via the sensing elements. In an alternative embodiment, an optional air blower or vacuum chamber may be placed along the aperture for reducing paper dust buildup.

Those skilled in the art will recognize that linear array imaging sensors (e.g., contact image sensors) are a power efficient alternative to traditional image capture devices (e.g., high-speed cameras) that necessitate specific placement, depth-of-field requirements, etc. Linear array imaging sensors feature a smaller form factor than traditional image capture devices, making them better suited for integration within or along the transport mechanism of a document processing device (e.g., sorter, inserter) to enable image capture even in restricted (tight) spaces. Furthermore, as all the necessary optical elements (e.g., focusing lenses, plurality of photo sensors) are included in a compact module, no mirrors or other optic devices need be employed to transmit light data to the sensors for image capture and/or construction. Resultantly, the exemplary techniques presented herein may be employed for all types of document processing devices, including but not limited to inserters, sorters and post production print inspection systems.

Figures 5, 6:
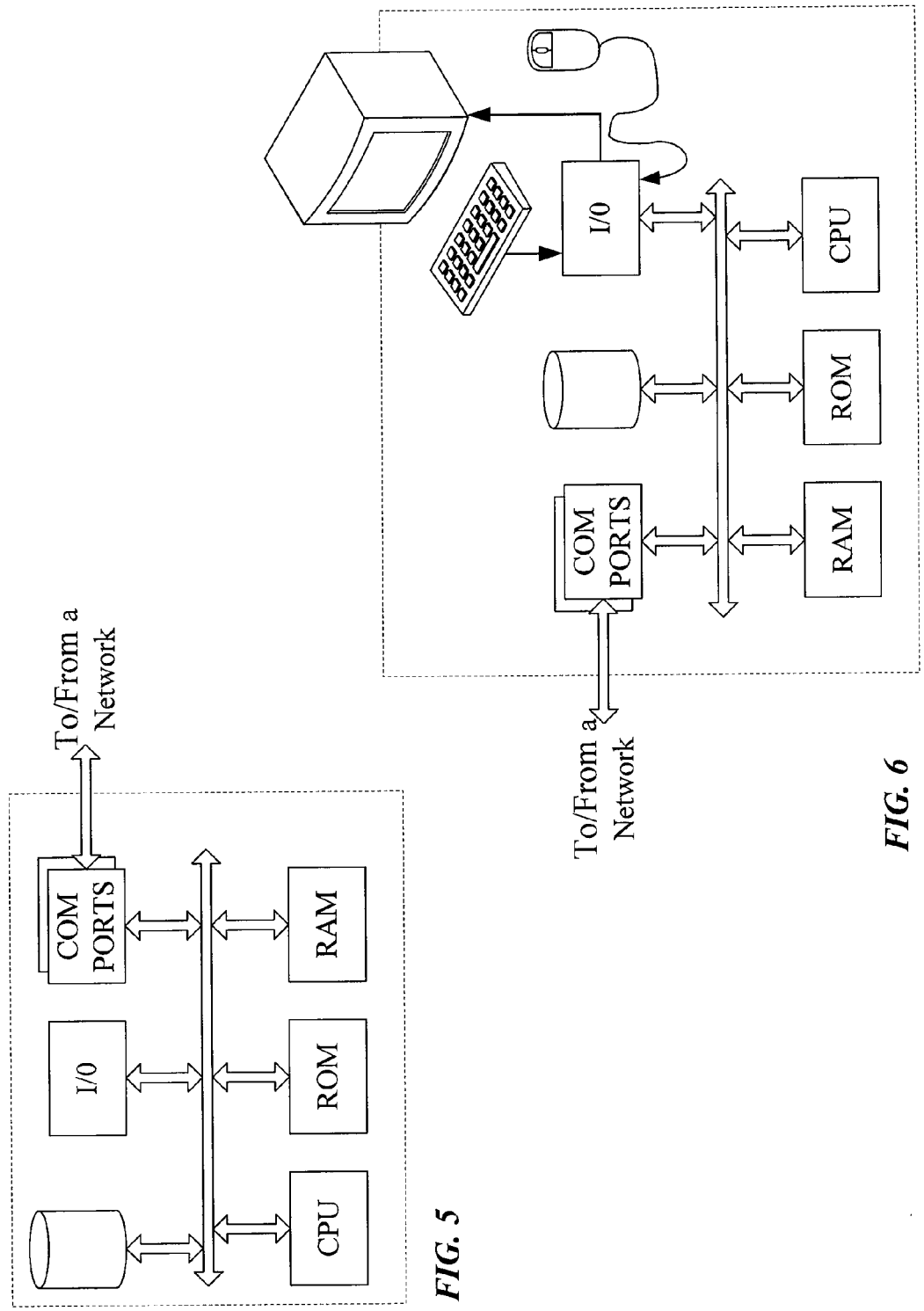
FIG. 5 illustrates a network or host computer platform, as may typically be used to implement a server.
FIG. 6 depicts a computer with user interface elements, as may be used to implement a personal computer or other type of work station or terminal device.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and, as a result, the drawings should be self-explanatory.

For example, control computer 600 may be a PC based implementation of a central control processing system like that of FIG. 6, or may be implemented on a platform configured as a central or host computer or server like that of FIG. 5. Such a system typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software as well as data, such as sort scheme instructions and image data. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer in a document factory may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for processing document data as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art. The present examples are not limited to any one network or computing infrastructure model—i.e., peer-to-peer, client server, distributed, etc.

Hence aspects of the techniques discussed herein encompass hardware and programmed equipment for controlling the relevant document processing as well as software programming, for controlling the relevant functions. A software or program product, which may be referred to as an "article of manufacture" may take the form of code or executable instructions for causing a computer or other programmable equipment to perform the relevant data processing steps regarding document printing and associated imaging and print quality verification, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the sorting control and attendant mail item tracking based on unique mail item identifier. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The invention claimed is:

1. A method of assessing the production quality of an article of a mail item during transport of the article within a mailpiece sorter or a mail inserter, the method comprising steps of:
   capturing, by a linear array imaging sensor, full line scan data for the article as a face of the article is transported at a continuous production speed in near proximity to the linear array imaging sensor, the linear array imaging sensor having a resolution substantially equal to a plurality of photo sensors of the linear array imaging sensor, wherein each of the photo sensors employs a focusing lens of a curvature for enabling a 1:1 relationship between a given sensor element and a portion of the article to be scanned, and the linear array imaging sensor having a form factor that facilitates placement along the mechanical transport path substantially perpendicular to the direction of transport;
   illuminating the article with white light during the capturing of the full line scan data;
   constructing an image of at least a portion of the face of the article from the full line scan data captured by the linear array imaging sensor; and
   evaluating the image of the article during the transport of the article at continuous production speed to assess production quality of the article, wherein the image has sufficient resolution for at least optical character recognition (OCR) analysis.

2. The method of claim 1, further comprising applying pressure to the article to position the document in near proximity to the linear array imaging sensor.

3. The method of claim 1, wherein evaluating the image comprises comparing the image to one or more of address quality data, known data representative of the article and postal authority based mail preparation data.

4. The method of claim 1, wherein the construction of at least a portion of the image is performed on a line-by-line basis in accord with the determined production speed of the article during transport.

5. The method of claim 1, wherein evaluating the image includes performing an article quality inspection, the inspection including affecting behavior of the document processing system or devices associated therewith and interpreting markings as displayed upon the face of the article.

6. The method of claim 1, further comprising the step of:
   sensing an entire length of a face of the article to be detected as it is within proximity of the linear array imaging sensor during transport.

7. A document processing system comprising:
   a mechanical transport path for transporting an article of a mail item in a direction of transport at a continuous production speed;
   a linear array imaging sensor lacking an associated optical transmission medium and having a form factor that facilitates placement along the mechanical transport path substantially perpendicular to the direction of transport and such that a face of the article travels in near proximity to the linear array imagining sensor, the linear array imaging sensor having a resolution substantially equal to a plurality of photo sensors of the linear array imaging sensor and capturing full line scan data for the article as the article travels at a continuous production speed, wherein each of the photo sensors employs a focusing lens of a curvature for enabling a 1:1 relationship between a given sensor element and a portion of the article to be scanned;

an illumination source proximate to the linear array imaging sensor to direct white light at the article as the article is transported at the continuous production speed and scanned by the linear array imaging sensor;

an image processor in communication with the linear imaging sensor that processes the line scan data to construct an image of at least a portion of the face of the article; and a control processor in communication with the image processor that evaluates the image of the article during the transport of the article at continuous production speed to assess production quality of the article, wherein the processor is configured to perform at least optical character recognition (OCR) analysis of the image, wherein the document processing system is selected from a mailpiece sorter or mail inserter.

8. The system of claim 7, further comprising an opaque platen that covers a portion of the linear array imaging sensor.

9. The system of claim 7, further comprising a stabilizer positioned proximate to the linear imaging sensor array for applying pressure to the document to position the document in near proximity to the linear array imaging sensor.

10. The system of claim 9, wherein the stabilizer comprises a roller.

11. The system of claim 9, wherein the stabilizer comprises a pneumatic device.

12. The system of claim 7, wherein the linear array imaging sensor is attached to an inserter.

13. The system of claim 7, wherein the linear array imaging sensor is attached to a sorter.

14. The system of claim 7, wherein the linear array imaging sensor is sized to be larger than or substantially equal to the width of the article.

15. The system of claim 7, wherein the linear array imaging sensor is configured to sense an entire length of a face of the article to be detected as it is within proximity of the linear array imaging sensor during transport.

16. An article of manufacture comprising:

a machine readable storage medium; and executable program instructions embodied in the machine readable storage medium that when executed by a programmable system in communication with a document processing system causes the system to perform functions that evaluate a portion of an article of a mail item during transport of the article within a document processing system, the functions comprising:

capturing, by a linear array imaging sensor, full line scan data for the article as a face of the article is transported at a continuous production speed in near proximity to the linear array imaging sensor, the linear array imaging sensor having a resolution substantially equal to a plurality of photo sensors of the linear array imaging sensor, wherein each of the photo sensors employs a focusing lens of a curvature for enabling a 1:1 relationship between a given sensor element and a portion of the article to be scanned, and the linear array imaging sensor having a form factor that facilitates placement along the mechanical transport path substantially perpendicular to the direction of transport;

illuminating the article with white light during the capturing of the full line scan data;

constructing an image of at least a portion of the face of the article from the full line scan data captured by the linear array imaging sensor; and evaluating the image of the article during the transport of the document at continuous production speed to assess production quality of the article, wherein the image is sufficient for at least optical character recognition (OCR) analysis, wherein the document processing system is selected from a mailpiece sorter or mail inserter.

17. The article of manufacture of claim 16, wherein the functions further comprise applying pressure to the article to position the article in near proximity to the linear array imaging sensor.

18. The article of manufacture of claim 16, wherein the function of evaluating the image comprises the function of comparing the image to one or more of address quality data, known data representative of the article and postal authority based mail preparation data.

19. The article of manufacture of claim 16, wherein the function of constructing at least a portion of the image is performed on a line-by-line basis in accord with the determined production speed of the article during transport.

20. The article of manufacture of claim 16, wherein the function of evaluating the image includes the function of performing an article quality inspection, the inspection including affecting behavior of the document processing system or devices associated therewith and interpreting markings as displayed upon the face of the article.

21. The article of manufacture of claim 16, wherein the functions further comprise:

sensing an entire length of a face of the article to be detected as it is within proximity of the linear array imaging sensor during transport.

* * * * *